C. E. WOOLF.
SHEARS.
APPLICATION FILED APR. 29, 1916.
1,210,128.
Patented Dec. 26, 1916.
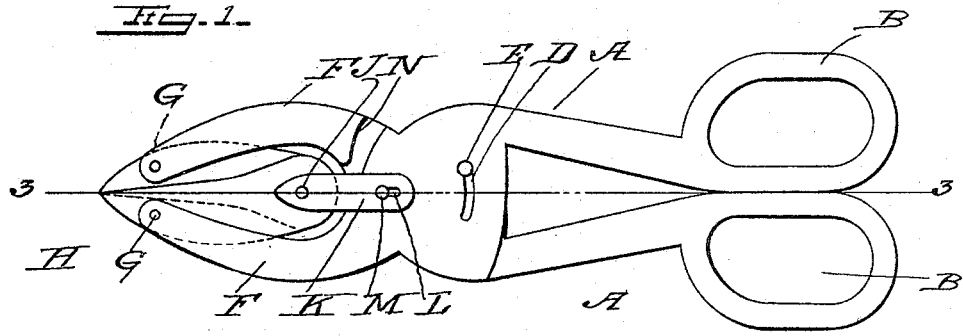
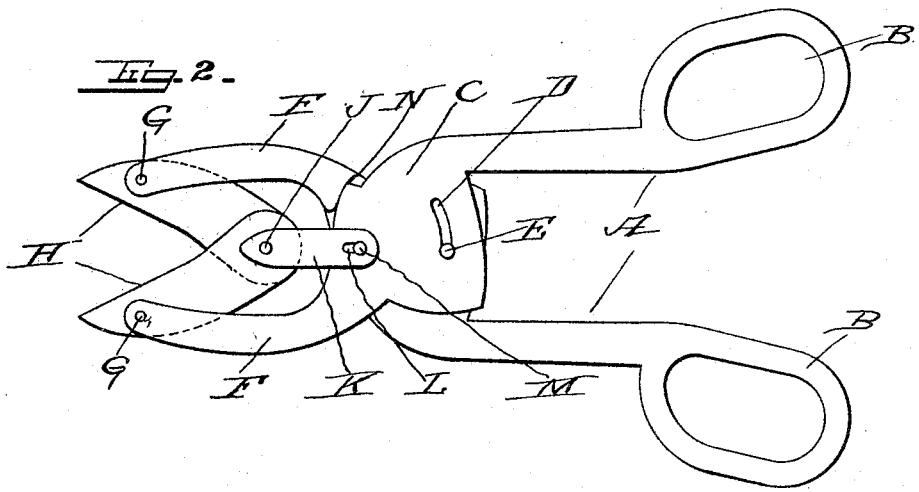
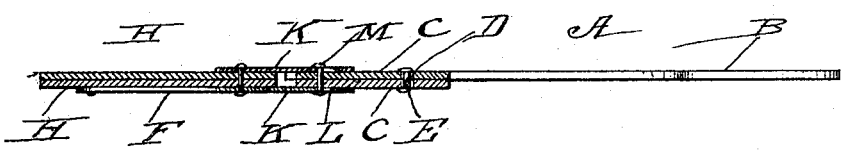

UNITED STATES PATENT OFFICE.

CHARLES E. WOOLF, OF WYNNEWOOD, PENNSYLVANIA.

SHEARS.

1,210,128.   Specification of Letters Patent.   Patented Dec. 26, 1916.

Application filed April 29, 1916. Serial No. 94,398.

*To all whom it may concern:*

Be it known that I, CHARLES E. WOOLF, a citizen of the United States, residing at Wynnewood, in the county of Montgomery and State of Pennsylvania, have invented certain new and useful Improvements in Shears, of which the following is a specification.

My invention relates to improvements in shears which while particularly constructed for use in trimming hedges or as pruning shears, may be used for any purpose where they would operate in an efficient manner.

The leading object of my invention is the provision of shears which will have greatly increased cutting power or action with the expenditure of very little human effort, thus obtaining a high degree of efficiency without tiring the user.

Another object of my invention is the provision of shears which can be operated with ease and which will insure the cutting of an increased amount of material with a clean smooth cut without much strain or wear upon the implement.

Another object of my invention is the provision of shears which will be easy to operate, which will be light in weight and very durable in construction, which may be manufactured at a low price, and which from every point of view will be thoroughly efficient and practical.

To attain the objects stated my invention consists of a pair of shears embodying novel features of construction, combination and arrangement of parts for service substantially as disclosed herein.

In order that the detailed construction and the operation of my shears may be understood and its advantages and points of merit be appreciated, I have shown in the accompanying drawing a pair of shears embodying my invention.

Figure 1 is a top plan view of a pair of shears constructed according to my invention with the parts in closed position. Fig. 2 is a similar view with the shears opened ready for cutting, and Fig. 3 is a sectional view taken on the line 3—3 of Fig. 1.

My shears are of extremely simple construction and may be said to consist of the pair of handles A, having finger loops B, intermediate enlarged heads or fulcrumed portions C, one of which is formed with a curved slot D, guided upon a pin E, carried by the other enlarged portion C, said portions C, having formed therewith the forked or bifurcated arms F, in which are pivoted at G, near their upper ends the pair of blades H, whose lower ends are connected by the pivot J, which connects the outer ends of the pair of links K, whose inner ends are formed with a horizontal slot L, guided upon the fulcrum or pivot end of the implement, said arms F, being each formed with a guiding shoulder or abutment M.

From the foregoing description taken in connection with the drawings the manner of using my shears will be readily understood, and it will be apparent that the opening of the handles also opens the cutting blade, and that the closing of the handles causes the blades to cut the material or object with a clean, smooth shear cut, this being accomplished with ease and rapidity. It will also be apparent that by my construction I secure a very strong or powerful cutting action with the expenditure of very little force or effort and that in this manner the shears are capable of cutting thick substance or material in a rapid and efficient manner with little effort and without tiring the user which is a great advantage. It will also be understood that my shears while possessing the advantages stated are very simple, durable and inexpensive, will withstand very hard using and may be employed for many purposes, and generally are desirable and practical.

The pair of links K, serve to hold the cutting blades H, in close and true relation and also cause said blades to work smoothly to insure a clean, shear cut, as well as distributing the strain and wear upon the parts of the shears.

I claim:—

1. The shears herein described, consisting of the handles having the finger loops, fulcrum enlargements and arms, the pair of cutting blades pivoted at or near their upper ends to said arms, and links having their outer ends pivoted to the inner ends of said blades and their inner ends movably mounted on the fulcrum of the shears.

2. The shears herein described, consisting of the handles having the finger loops, fulcrum enlargements and arms, the pair of cutting blades pivoted at or near their upper ends to said arms, and links having their outer ends pivoted to the inner ends of said blades and their inner ends movably mounted on the pivot or fulcrum of the shears, said handles having the fulcrum enlargements limited and guided in their movement by a pin and slot connection.

3. The shears herein described, consisting of the handles having the finger loops, fulcrum enlargements and arms, the pair of cutting blades pivoted at or near their upper ends to said arms, and links having their outer ends pivoted to the inner ends of said blades and their inner ends movably mounted on the fulcrum of the shears, said handles being connected by a pin and slot connection and having shouldered guiding portions on the arms thereof.

4. The shears herein described consisting of the handles having finger loops, intermediate enlarged heads and bifurcated arms, a pair of blades pivoted in said bifurcated arms at or near their upper ends, a pin pivotally securing the inner ends of said blades, and links having their outer ends pivoted to the said pin and having a slot in their inner ends, said intermediate enlarged heads having a pivot engaging the slots in the inner ends of the links, one of the intermediate enlarged heads having a curved slot therein and the other carrying a pin engaging said slot for limiting the opening of the blades, substantially as described.

5. The shears herein described consisting of the handles having finger loops, intermediate enlarged heads and bifurcated arms, said arms being formed with a guiding shoulder, a pair of blades pivoted in said bifurcated arms at or near their outer free ends, a pin pivotally securing the inner ends of said blades, and links having their outer ends pivoted to the said pin and having a slot in their inner ends, the pivot of said intermediate enlarged heads engaging said slots, one of the intermediate enlarged heads having a curved slot therein and the other carrying a pin, said pin engaging the last-named slot for limiting the opening of the blades, substantially as described.

In testimony whereof I affix my signature in the presence of two witnesses.

CHARLES E. WOOLF.

Witnesses:
J. HERBERT BALTZ,
LOUISE H. KAIN.

Copies of this patent may be obtained for five cents each, by addressing the "Commissioner of Patents, Washington, D. C."